US009298416B2

(12) United States Patent
Bilinski et al.

(10) Patent No.: US 9,298,416 B2
(45) Date of Patent: Mar. 29, 2016

(54) ADDING MEDIA TO A LOCKER (71) Applicant: Google Inc., Mountain View, CA (US)

(72) Inventors: Brandon Bilinski, San Francisco, CA (US); Owen Daniel Otto, Oakland, CA (US); Paul Nicholas Gennai, San Francisco, CA (US); Bo Yang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/760,552

(22) Filed: Feb. 6, 2013

(65) Prior Publication Data

US 2014/0223302 A1    Aug. 7, 2014

(51) Int. Cl.
    G06F 3/048     (2013.01)
    G06F 3/16      (2006.01)
    G06F 17/30     (2006.01)

(52) U.S. Cl.
    CPC ........ *G06F 3/167* (2013.01); *G06F 3/048* (2013.01); *G06F 17/3074* (2013.01)

(58) Field of Classification Search
    CPC .................................................. G06F 3/048
    USPC .......................................................... 715/716
    See application file for complete search history.

(56) References Cited

U.S. PATENT DOCUMENTS

| 8,239,443    | B2 * | 8/2012  | Koka ............... G06F 21/10 705/59 |
| 2003/0093665 | A1 * | 5/2003  | Cooper et al. ............ 713/156 |
| 2007/0048712 | A1 * | 3/2007  | Plastina et al. ............ 434/308 |
| 2008/0235331 | A1 * | 9/2008  | Melamed ............ H04L 67/104 709/204 |
| 2009/0276709 | A1   | 11/2009 | Venneman et al. |
| 2012/0323938 | A1 * | 12/2012 | Skeen et al. ............... 707/754 |

FOREIGN PATENT DOCUMENTS

| WO |    2009150439 A1  | 12/2009 |
| WO | WO 2011086465 A1 * | 7/2011 |
| WO |    2012167272 A1  | 12/2012 |

OTHER PUBLICATIONS

SoundCloud.com, "SoundCloud—The Tour—Your Sound, on the Web," available at http://soundcloud.com/tour/web, p. 1-2, Aug. 6, 2012.
Peter Kim, "Sound Cloud + TuneCore Get Your Music Sold Online; Hear Some Artists," available at http://createdigitalmusic.com/2010/09/ soundcloud-tunecore-get-your-music-sold-online/, pp. 1-4, Sep. 17, 2010.
Apple, "iTunes Link Maker," available at http://itunes.apple.com/linkmaker/, p. 1, Aug. 6, 2012.
"ISR of PCT/US2014/014865 dated Jul. 8, 2014".

* cited by examiner

*Primary Examiner* — Jennifer To
*Assistant Examiner* — Ashley Fortino
(74) *Attorney, Agent, or Firm* — Morris & Kamlay LLP (57) ABSTRACT A method for uploading content to a server may include associating an identifier and a trigger with a digital audio item uploaded to the server for inclusion into a digital multimedia store managed by the server. The identifier may identify the digital audio item from a plurality of other audio items available at the digital multimedia store. If the trigger is active, a first user interface may be displayed in the digital multimedia store. The first user interface may be associated with the uploaded digital audio item and may provide code for executing an embedding functionality. Upon execution, the embedding functionality may allow for automatic inclusion of the digital audio item into an individual media profile of a user. The media profile may be managed by the server and may be associated with the digital multimedia store.

22 Claims, 6 Drawing Sheets

ADDING MEDIA TO A LOCKER

BACKGROUND

There is a limited number of ways to save media (e.g., music, videos, e-books, etc.) into a cloud-based media locker service. For example, a user may upload their own personal media (e.g., personal music files, such as mp3 files), or media may be purchased from a media store that is tightly integrated with that personal media locker, and then uploaded into the media locker. There are also many other media files on the web, which are available for free (e.g., free music, promotional videos, free e-books, free TV shows, etc.). However, inclusion of such free media into a user's cloud-based media locker service may be a confusing and time consuming task. For example, a song that is available for free on the Internet, may first need to be downloaded locally by the user and saved in a directory that is being monitored (synched) by the media locker service uploader software, and then it may need to be uploaded to the cloud-based locker service for subsequent consumption by the user.

Further limitations and disadvantages of conventional and traditional approaches will become apparent to one of skill in the art, through comparison of such approaches with some aspects of the present method and apparatus set forth in the remainder of this disclosure with reference to the drawings.

SUMMARY

A system and/or method is provided for adding media to a cloud-based media locker using a distributed widget, substantially as shown in and/or described in connection with at least one of the figures, as set forth more completely in the claims.

In accordance with an example embodiment of the disclosure, a method for uploading content to a server may include associating an identifier and a trigger (e.g., a Boolean value) with a digital audio item uploaded to the server for inclusion into a digital multimedia store managed by the server. The identifier may identify the digital audio item from a plurality of other audio items available at the digital multimedia store. If the trigger is active (e.g., when the Boolean value is set to TRUE), a first user interface may be displayed in the digital multimedia store. The first user interface may be associated with the uploaded digital audio item and may provide code for executing an embedding functionality. Upon execution, the embedding functionality may allow for automatic inclusion of the digital audio item into an individual media profile of a user. The media profile may be managed by the server and may be associated with the digital multimedia store. The automatic inclusion of the digital audio item into the individual media profile takes place without payment of any fees by the user.

These and other advantages, aspects and features of the present disclosure, as well as details of illustrated implementation(s) thereof, will be more fully understood from the following description and drawings.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "e.g.," introduces a list of one or more non-limiting examples, instances, or illustrations. As utilized herein, the term "processor" may be used to refer to one or more of a central processing unit, a processor of a symmetric or asymmetric multiprocessor system, a digital signal processor, a micro-controller, a graphics/video processor, or another type of processor.

The present disclosure relates to a method and system for adding media to a cloud-based media locker using a distributed widget. In various implementations, a digital rights holder (DRH) media portal, a distributor media portal and an end user media portal may be used to enable various aspects of the disclosure.

Figure 1:
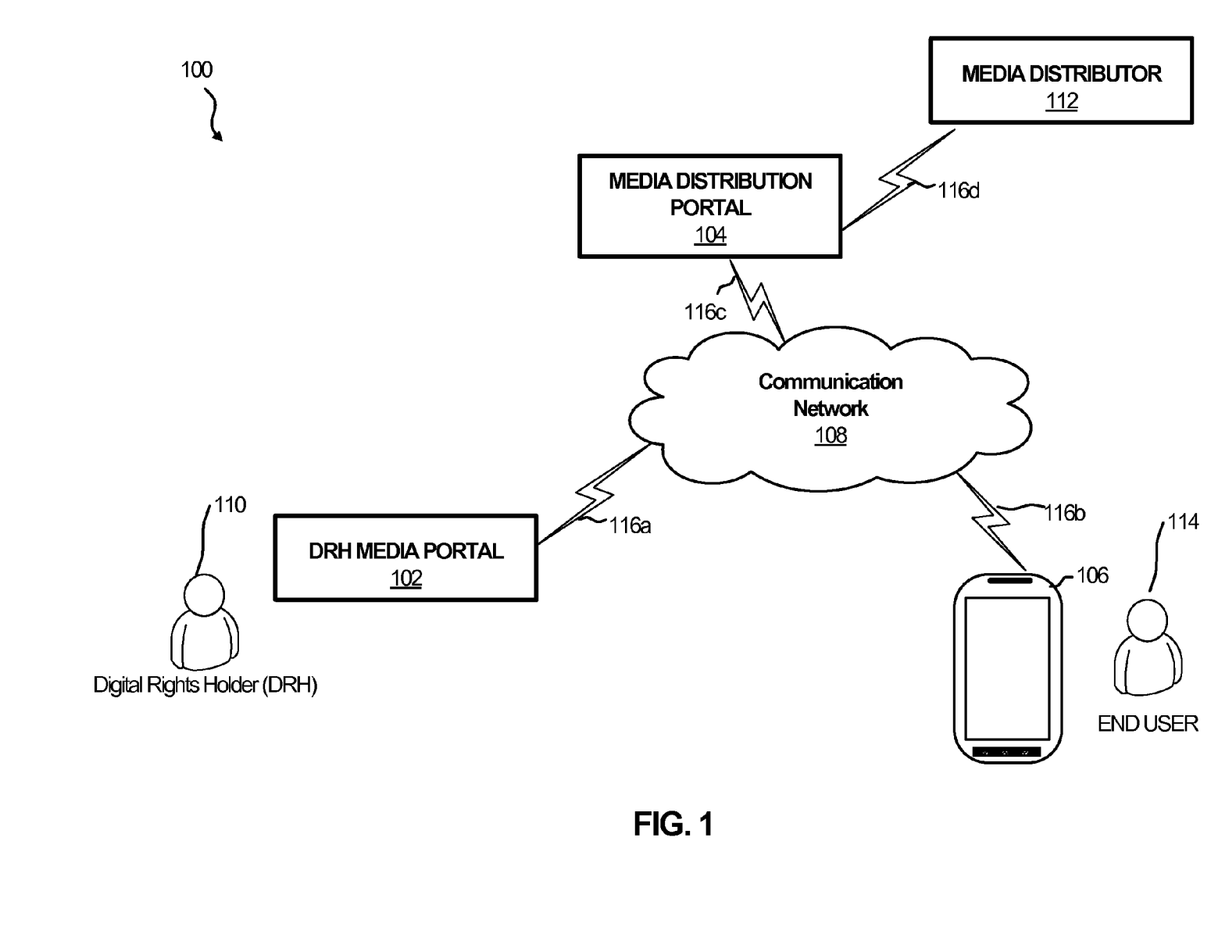
FIG. 1 is a block diagram illustrating an example architecture for adding media to a cloud-based media locker using a distributed widget, in accordance with an example embodiment of the disclosure.

FIG. 1 is a block diagram illustrating an example architecture for adding media to a cloud-based media locker using a distributed widget, in accordance with an example embodiment of the disclosure. Referring to FIG. 1, the example architecture 100 may comprise a DRH media portal 102 associated with a DRH 110; a media distribution portal 104 associated with a media distributor 112; and an end user media portal comprising an end user client device 106 associated with end user 114. The media portals 102-104 and client device 106 may communicate with each other via communication network 108 and communication links 116a-116d.

The communication network 108 may comprise suitable logic, circuitry, interfaces, and/or code and may be configured to support one or more wired protocols (e.g., Ethernet standards, MOCA, etc.) and/or wireless protocols or interfaces (e.g., CDMA, WCDMA, TDMA, GSM, GPRS, UMTS, EDGE, EGPRS, OFDM, TD-SCDMA, HSDPA, LTE, WiMAX, WiFi, Bluetooth, and/or any other available wireless protocol/interface), facilitating transmission and/or reception of signals to and/or from the media portals 102-104 and the client device 106. In this regard, the communication links 116a-116d may comprise wired and/or wireless communication links.

The DRH media portal 102 and the media distribution portal 104 may comprise suitable circuitry, logic and/or code and may be operable to perform one or more aspects of adding media to a cloud-based media locker, as related to the digital rights holder 110 (or the media author/creator) and the media distributor 112, respectively.

For example, the DRH media portal 102 may comprise suitable circuitry, logic and/or code and may be operable to facilitate upload of digital media (e.g., songs) created by the DRH 110. Additionally, in instances when the DRH 110 desires the uploaded digital media to be free, the DRH media portal 102 may provide functionality and allow a distributor widget associated with the digital media to be embeddable (e.g., by a media distributor 112, on the media distributor's digital media store).

The media distribution portal 102 may comprise suitable circuitry, logic and/or code and may be operable to use the functionality provided by the DRH media portal 102 (e.g., iframe code) and embed a distributor widget with the DRH uploaded digital media at, for example, a distributor digital media store (e.g., an on-line store). In accordance with an example embodiment of the disclosure, the distributed widget may be one or more software buttons appearing next to the digital media (e.g., a song, an album, a video, etc.) and upon activating the button, allowing for transfer of the digital media to a cloud-based media locker of a user.

The end user 114 may use the client device 106 to visit the distributor digital media store and activate at least one software button appearing as part of a distributor widget associated with certain digital media (e.g., digital media offered as a free download). Upon activating the software button, the associated digital media (e.g., a free song, album, video, or other media) may be added to a cloud-based media locker of the user 114. The cloud-based media locker of user 114 may be part of a media distribution/management service of the media distributor 112 (e.g., an on-line digital media sale or subscription service). Additional details regarding the portals 102-104 as well as the client device 106 are provided herein below in reference to FIGS. 2A-5.

Figure 2A:
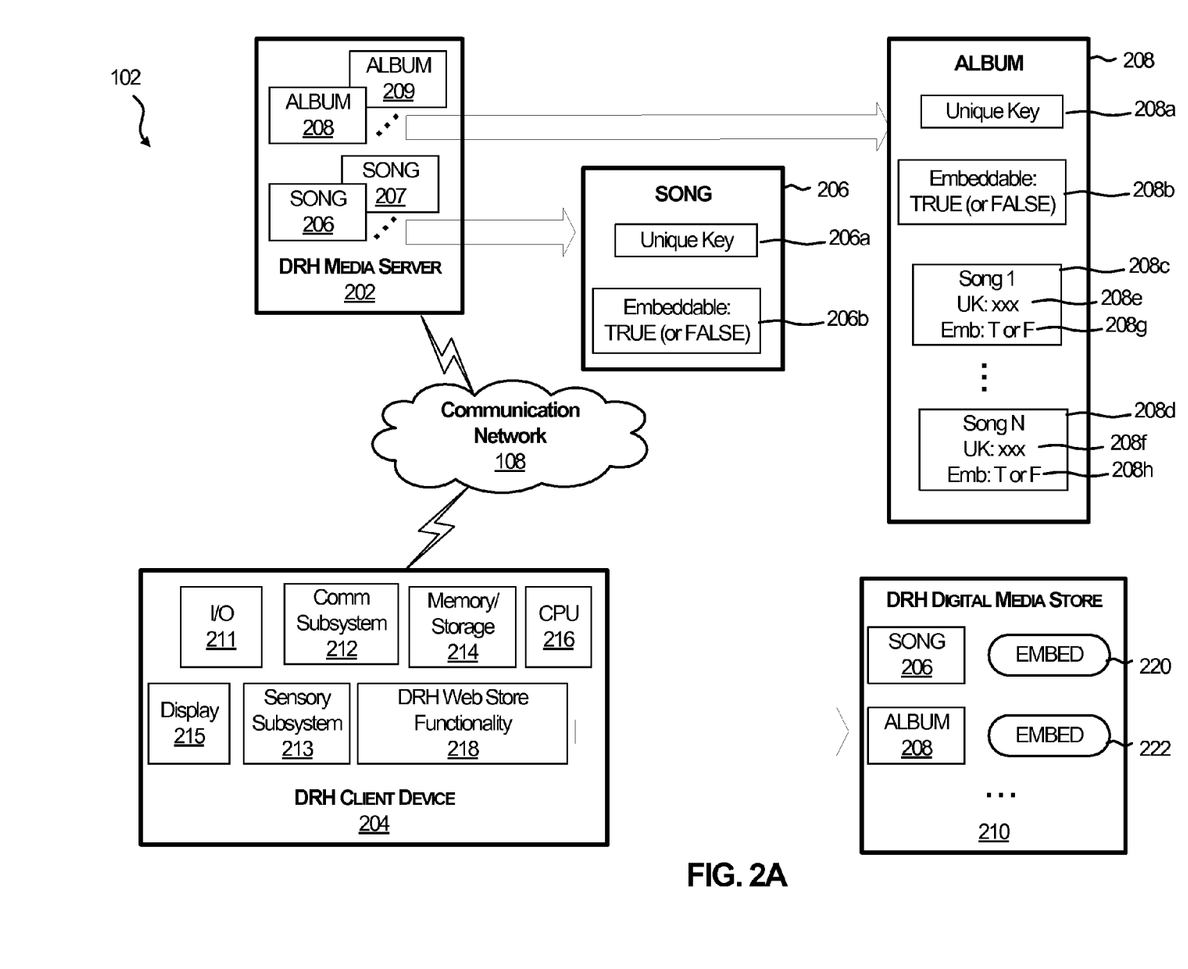
FIG. 2A is a block diagram illustrating a digital rights holder (DRH) media portal supporting adding media to a cloud-based media locker using a distributed widget, in accordance with an example embodiment of the disclosure.

FIG. 2A is a block diagram illustrating a digital rights holder (DRH) media portal supporting adding media to a cloud-based media locker using a distributed widget, in accordance with an example embodiment of the disclosure. Referring to FIG. 2A, there is illustrated a more detailed diagram of the DRH media portal 102. The DRH media portal 102 may comprise a DRH client device 204 and a DRH media server 202.

The DRH client device 204 may include a handset, a smartphone, a personal computer, a tablet, a laptop, and/or another handheld or portable device. The DRH client device 204 may comprise, for example, a main processor 216, a system memory 214, a communication subsystem 212, a sensory subsystem 213, an input/output (I/O) subsystem 211, and a display 215. The computing device may also comprise a DRH web store functionality module 218.

The main processor 216 may comprise suitable logic, circuitry, interfaces, and/or code that may be operable to process data, and/or control and/or manage operations of the DRH client device 204, and/or tasks and/or applications performed therein in connection with the architecture 100 for adding media to a cloud-based media locker using a distributed widget. In this regard, the main processor 216 may be operable to configure and/or control operations of various components and/or subsystems of the DRH client device 204, by utilizing, for example, one or more control signals. The main processor 216 enables running and/or execution of applications, programs and/or code, which may be stored, for example, in the system memory 214. Alternatively, one or more dedicated application processors may be utilized for running and/or executing applications (or programs) in the computing device 100. The main processor 216 may also enable uploading of one or more digital media items (e.g., music albums 208, . . . 209 and songs 206, . . . , 207) to the DRH media server 202.

In some instances, one or more of the applications running and/or executing on the DRH client device 204 may generate and/or update video content that may be rendered via the display 215.

The system memory 214 may comprise suitable logic, circuitry, interfaces, and/or code that may enable permanent and/or non-permanent storage, buffering, and/or fetching of data, code and/or other information, which may be used, consumed, and/or processed. In this regard, the system memory 214 may comprise different memory technologies, including, for example, read-only memory (ROM), random access memory (RAM), Flash memory, solid-state drive (SSD), and/or field-programmable gate array (FPGA). The system memory 214 may store, for example, configuration data, which may comprise parameters and/or code, comprising software and/or firmware.

The communication subsystem 212 may comprise suitable logic, circuitry, interfaces, and/or code operable to communicate data from and/or to the computing device, such as via one or more wired and/or wireless connections associated with communication network 108. The communication subsystem 212 may be configured to support one or more wired protocols (e.g., Ethernet standards, MOCA, etc.) and/or wireless protocols or interfaces (e.g., CDMA, WCDMA, TDMA, GSM, GPRS, UMTS, EDGE, EGPRS, OFDM, TD-SCDMA, HSDPA, LTE, WiMAX, WiFi, Bluetooth, and/or any other available wireless protocol/interface), facilitating transmission and/or reception of signals to and/or from the DRH client device 204, and/or processing of transmitted or received signals in accordance with applicable wired or wireless protocols. In this regard, signal processing operations may comprise filtering, amplification, analog-to-digital conversion and/or digital-to-analog conversion, up-conversion/down-conversion of baseband signals, encoding/decoding, encryption/decryption, and/or modulation/demodulation. In accordance with an embodiment of the disclosure, the communication subsystem 212 may provide wired and/or wireless connections to, for example, the DRH media server 202 and/or one or more devices within the media distribution portal 104 via wired and/or wireless connections associated with communication network 108.

The sensory subsystem 213 may comprise suitable logic, circuitry, interfaces, and/or code for obtaining and/or generating sensory information, which may relate to the DRH client device 204, its user(s), and/or its environment. For example, the sensory subsystem 213 may comprise positional or locational sensors (e.g., GPS or other GNSS based sensors), ambient conditions (e.g., temperature, humidity, or light) sensors, and/or motion related sensors (e.g., accelerometer, gyroscope, pedometers, and/or altimeters).

The I/O subsystem 211 may comprise suitable logic, circuitry, interfaces, and/or code for enabling user interactions with the DRH client device 204, enabling obtaining input from user(s) and/or to providing output to the user(s). The I/O subsystem 110 may support various types of inputs and/or outputs, including, for example, video, audio, and/or textual. In this regard, dedicated I/O devices and/or components, external to or integrated within the DRH client device 204, may be utilized for inputting and/or outputting data during operations of the I/O subsystem 211. Example I/O devices may comprise displays, mice, keyboards, touchscreens, voice input interfaces, and other input/output interfaces or devices. With respect to video outputs, the I/O subsystem 211 may be operable to generate and/or process video content, graphics, and/or textual data, and/or generate video frames based thereon for display, via the display 215 for example.

The display 215 may comprise suitable logic, circuitry, interfaces and/or code that may enable displaying of video content, which may be handled and/or processed via the I/O subsystem 211. The display 215 may be used in outputting video data.

The DRH web store functionality module 218 may comprise suitable circuitry, logic and/or code and may be operable to provide functionalities for setting up, hosting and/or maintaining an online DRH digital media store 210.

The DRH media server 202 may comprise suitable circuitry, logic and/or code and may be operable to store one or more digital media items authored by the DRH 110.

Even though the DRH media portal 102 is illustrated separately from the media distribution portal 104, the disclosure may not be limited in this regard. More specifically, one or more devices within the DRH media portal 102 may be implemented as part of the media distribution portal 104. Alternatively, the DRH 110 may use one or more of the devices within the media distribution portal 104 (in addition to or in lieu of one or more devices in the DRH media portal 102) to perform any of the DRH functionalities disclosed herein for adding media to a cloud-based media locker using a distributed widget.

In operation, the DRH 110 may use the DRH client device 204 to upload one or more digital media items (e.g., albums 208, ..., 209 and songs 206, ..., 207) to the DRH media server 202. In the alternative, the DRH 110 may use the DRH client device 204 to upload the one or more digital media items (e.g., albums 208, ..., 209 and songs 206, ..., 207) directly to the digital media library 305 (in FIG. 3), or to another network device within the media distribution portal 104.

Figure 3:
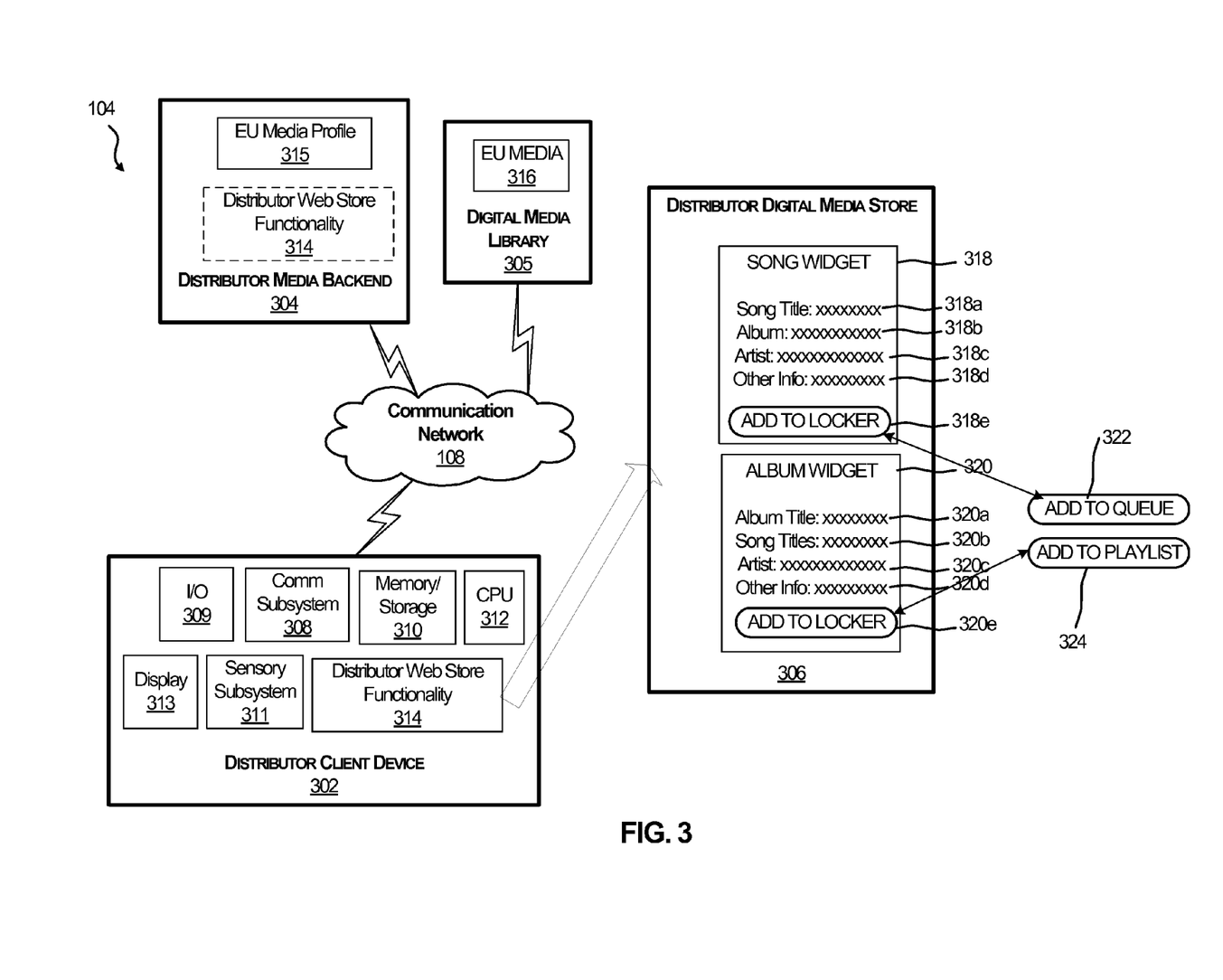
FIG. 3 is a block diagram illustrating a distributor media portal supporting adding media to a cloud-based media locker using a distributed widget, in accordance with an example embodiment of the disclosure.

When the DRH 110 uploads the digital media items (e.g., albums 208, ..., 209 and songs 206, ..., 207) to the media server 202 or the media library 305, the DRH 110 may opt for one or more of the uploaded digital media items to be free. In such instance, the DRH 110 may be presented with the option to allow those digital media items (e.g., song 206 and album 208) to be embeddable.

In instances when the DRH 110 selects that one or more of the uploaded digital media items to be free, then the corresponding digital media item is stored (e.g., in the DRH media server 202 or the distributor media library 305) with additional information allowing embedding functionality to be associated with the free digital media item. More specifically, when the DRH 110 selects a "free" digital media item option for a song track (e.g., song 206), a unique key 206a may be created for the song 206, as well as an additional trigger field 206b. The trigger 206b may comprise a Boolean value, and the trigger may be active if the Boolean value is set to TRUE. The Boolean field 206b may be designated as "Embeddable:" and may be set to TRUE (if the DRH 110 has opted for the corresponding digital item to be available free of charge) or FALSE (if the DRH 110 has opted for the corresponding digital item not to be available free of charge).

In instances when the DRH 110 opts for an entire album (e.g., album 208) to be free, then a unique key 208a and a Boolean field ("Embeddable:") 208b (set to TRUE) are created for the album 208. Additionally, since the album 208 includes music tracks (or songs) 208c, ..., 208d, corresponding unique keys 208e, ..., 208f and Boolean fields ("Embeddable:") 208g, ..., 208h (set to TRUE) are created for the corresponding songs 208c, ..., 208d.

Each of the unique keys (e.g., 206a, 208a, 208c, ..., 208d) may be used to distinguish the corresponding digital media item from other digital media items in, for example, an online digital media store. In this regard, the unique keys may be assigned by, for example, one or more devices associated with the media distribution portal 104 (e.g., by the distributor media backend 304 or digital media library 305) or one or more devices associated with the DRH media portal 102.

In instances when the DRH-created digital media items (e.g., song 206 and album 208) are to be displayed in the DRH digital media store 210, the unique keys may be assigned by the DRH client device 204 or the media server 202. In instances when the DRH-created digital media items (e.g., song 206 and album 208) are to be displayed in the distributor digital media store 306, the unique keys may be assigned by the distributor client device 302, the distributor media backend 304 or the digital media library 305.

In addition to the unique key and the Boolean ("Embeddable: TRUE or FALSE") field, each uploaded digital media item is also associated with an embed URL locator, identifying the location where the digital media item is stored. For example, the embed URL record may be stored with the digital media item (or separately) and may take the following form for a music track (or song): http://www.musicsite.com/embed/track/UNIQUEKEY, and the following form for a music album: http://www.musicsite.com/embed/album/UNIQUEKEY.

In instances when a digital media store is set up (e.g., the DRH digital media store 210 set up using the DRH web store functionality 218), any tracks or albums that have the Boolean ("Embeddable:") field set to TRUE (e.g., song 206 and album 208) will have an additional "EMBED" button (e.g., 220 and 222, respectively), which may appear next to the corresponding digital media item (206 and 208) when displayed in the digital media store 210. Functionalities of the "EMBED" button are discussed herein below in reference to FIG. 2B.

Figure 2B:
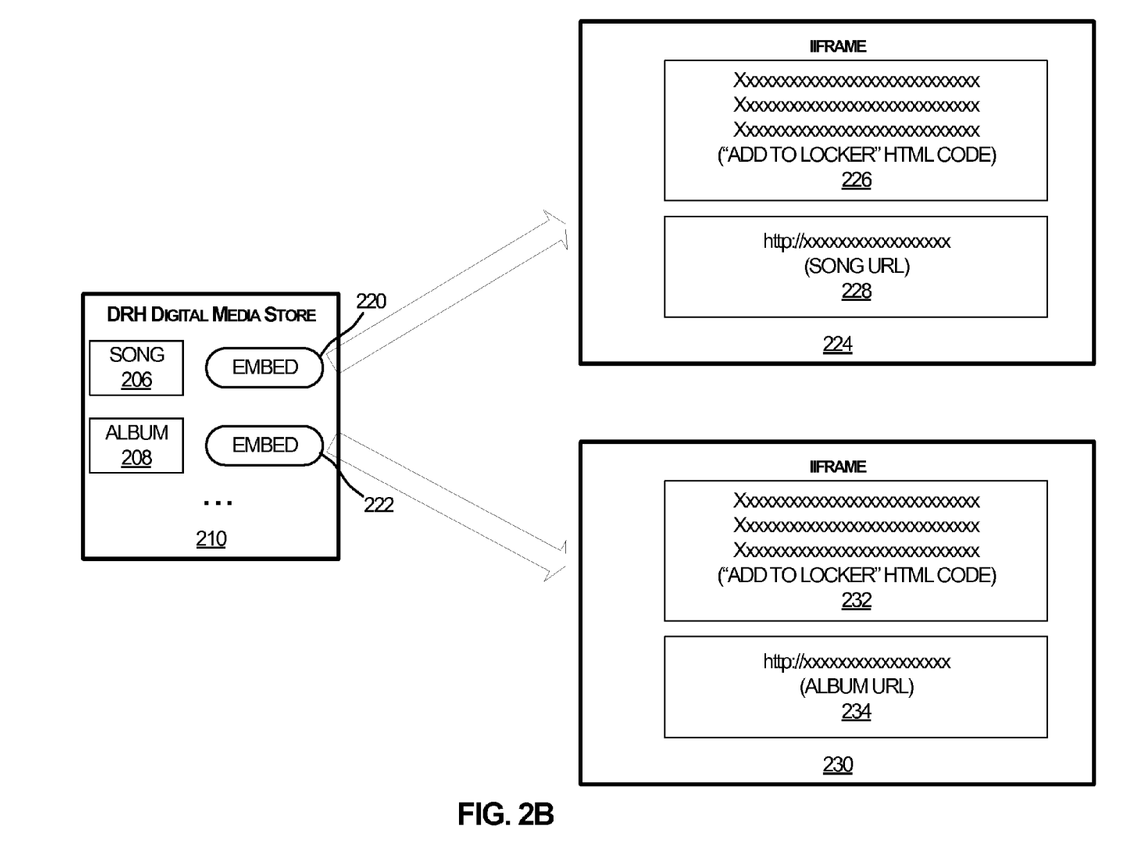
FIG. 2B is a block diagram illustrating a DRH media store, which may be used in the architecture of FIG. 1, in accordance with an example embodiment of the disclosure.

FIG. 2B is a block diagram illustrating a DRH media store, which may be used in the architecture of FIG. 1, in accordance with an example embodiment of the disclosure. Referring to FIG. 2B, there is illustrated the DRH media store 210 showing the song 206 and album 208 with corresponding "EMBED" software buttons 220 and 222, respectively.

When a user visits the DRH digital media store 210 and clicks the "EMBED" button (220 or 222), the user will receive a popup that shows HTML code for the distributed widget to be embedded on their web page. The HTML code may be an iframe that contains user interface code for displaying a distributor widget comprising a software button (e.g., "ADD TO LOCKER" button) and a link to the embed URL of the track or album (in a form as stated herein above). Upon activating the software button (e.g., "ADD TO LOCKER" button), the corresponding digital media item may be added to a cloud-based digital media locker service of the user.

For example, if a user clicks the "EMBED" button 220 associated with song 206, the iframe 224 will be displayed to the user. The iframe 224 may comprise "ADD TO LOCKER" HTML code 226 and a URL record 228 (for the location of the song 206). Similarly, if the user clicks the "EMBED" button 222 associated with album 208, the iframe 230 will be displayed to the user. The iframe 230 may comprise "ADD TO LOCKER" HTML code 232 and a URL record 234 (for the location of the album 208).

As used herein, the term "distributor" may refer to anyone who clicks on an "EMBED" button and uses the HTML code to place the distributor widget on their own web page (e.g., a distributor digital media store, such as 306 in FIG. 3). In this regard, a distributor (e.g., media distributor 112) may simply paste the HTML code snippet 226 in the body of their webpage (e.g., the distributor digital media store 306) in order for the distributor widget (including the "ADD TO LOCKER" button) to be present in the digital media store.

In accordance with an example embodiment of the disclosure, instead of providing HTML code (226, 232) for embedding, the EMBED button 220 and/or 222 may be a "SHARE" button. One option for sharing (e.g., in a sub-menu) would be "EMBED," but there may be other options for sharing on, for example, social media web sites (e.g., Google+, Facebook, Twitter) or by email. In instances when the selected sharing service does not support iFrames (e.g., Twitter or Email), only the embed link with the unique key may be used for sharing. When a user then clicks on this received information from Twitter or from their Email, the same RPC call may be made but without providing the widget UI (shown in FIG. 3). In other instances, the shared link may take the user to a page that shows them what tracks they are adding and has an "ADD TO LOCKER" button on the site for them to click on.

Example illustrations of a song widget (318) and album widget (320), which include "ADD TO LOCKER" buttons, are shown in FIG. 3 and discussed herein below.

FIG. 3 is a block diagram illustrating a distributor media portal supporting adding media to a cloud-based media locker using a distributed widget, in accordance with an example embodiment of the disclosure. Referring to FIG. 3, there is illustrated a more detailed diagram of the distributor media portal 104, which may comprise a distributor client device 302, a distributor media backend 304, and a digital media library 305.

The distributor client device 302 may include one or more of a handset, a smartphone, a personal computer, a network server, a tablet, a laptop, and/or another handheld or portable device. The distributor client device 302 may comprise, for example, a main processor 312, a system memory 310, a communication subsystem 308, a sensory subsystem 311, an input/output (I/O) subsystem 309, and a display 313, which have similar functionalities as the main processor 216, the system memory 214, the communication subsystem 212, the sensory subsystem 213, the input/output (I/O) subsystem 211, and the display 215 (in FIG. 2A), respectively.

The distributor media backend 304 may comprise suitable circuitry, logic and/or code and may be operable to provide digital media distribution/management service (e.g., an on-line digital media sale or subscription service for digital media). In this regard, the distributor media backend 304 may manage/store one or more end user (EU) media profiles (e.g., the EU media profile 315). The EU media profiles may store information associated with digital media items purchased/downloaded by a corresponding user, as well as personal media preferences, media playlists, authentication data, media queue data, etc. The distributor media backend 304 may also comprise the distributor web store functionality 314 for setting up, hosting and managing the distributor online digital media store 306.

The digital media library 305 may comprise suitable circuitry, logic and/or code and may be operable to store digital media available for sale in a distributor digital media store (e.g., 306) and/or digital media already purchased by an end user (e.g., EU media 316).

The distributor client device 302 may comprise suitable circuitry, logic and/or code and may be operable to provide functionalities associated with adding media to a cloud-based media locker using a distributed widget. More specifically, the distributor client device 302 may be used to provide, for example, distributor web store functionality 314, for setting up and managing a distributor online digital media store 306. In this regard, the client device 302 may use the HTML code snippet (e.g., 226 and 232) in the body of the webpage for the distributor digital media store 306, in order for the distributor widget (e.g., 318, 320) to be present in the digital media store 306.

Even though FIG. 3 illustrates the distributor media backend 304 and the distributor client device 302 as separate devices, the present disclosure is not limited in this regard and in some instances both devices may be implemented as a single device, performing the above recited functionalities associated with the media backend 304 and the client device 302.

Referring to FIGS. 2B-3, the distributor 112 may implement the HTML code 226 and 232 (together with the URL locator records 228, 234) in the digital media store 306, to trigger display of the distributor widgets 318 (a song widget) 319 (an album widget). The song widget 318 may comprise identifying information about song 206, such as song title 318a, album title (the song belongs to) 318b, artist 318c, and other song-related identifying information 318d. Similarly, the album widget 320 may comprise identifying information about album 208, such as album title 320a, the song titles 320b in the album, artist 320c, and other album-related identifying information 320d.

Both the song widget 318 and the album widget 320 may comprise corresponding "ADD TO LOCKER" software buttons 318e, 320e. Upon activation of these software buttons by an end user, the corresponding song 206 and/or album 208 may be added to a cloud-based media locker service of the end user (e.g., cloud-based media locker service maintained by the media backend 304), associated with a specific EU media profile (e.g., EU media profile 315 managed by the backend 304).

In accordance with an example embodiment of the disclosure, the widget 318 or 320 may contain other information about the song/album, such as duration, album art, year of release and genre. When the distributor clicks the EMBED button (220 or 222), they may be presented with a number of different widget user interfaces (UIs). These UIs may be predetermined by the distributor 112 or the DRH 110. In the alternative, custom style sheets (CSS) from the distributor 112 may be allowed, so that color schemes along with metadata choices could be displayed in the widget 318, 320. The widget 318, 320 may also include a media player that allows an end user 114 to listen to the song first before adding it (by activating the ADD TO LOCKER buttons 318e, 320e). The media player may stream the song as normal since the URL of the song/album location (228, 234) is already available and present with the digital media saved in the server 202 (or in a server managed by the distributor 112).

Figure 4:
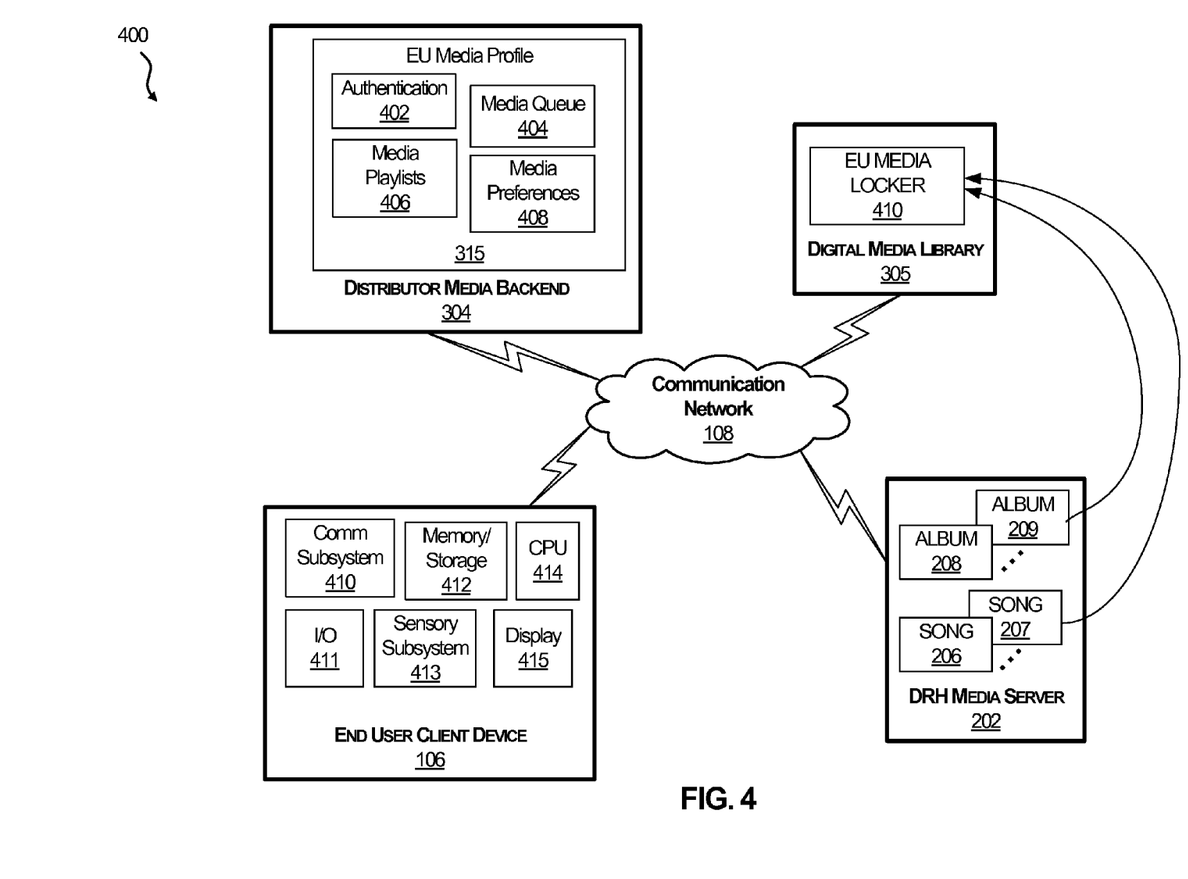
FIG. 4 is a more detailed block diagram of the example architecture of FIG. 1, in accordance with an example embodiment of the disclosure.

In accordance with an example embodiment of the disclosure, the widgets 318, 320 may provide ADD TO QUEUE button 322 and/or ADD TO PLAYLIST button 324 (which may be in addition to or in lieu of the ADD TO LOCKER buttons 318e, 320e). In this regard, the widgets 318, 320 may provide the functionality for a user to add the song 206 and/or album 208 directly to a playlist (e.g., as managed by the media playlists module 406) or to a music queue (as managed by the media queue module 404). Upon activating buttons 324 or 322, a call can be made into modules 406 or 404 in the user's profile 315, and retrieve a list of all their playlists or music queues and add the track/album to them. When the ADD TO PLAYLIST button is activated, the song/album may be added to the locker and also the pointer to that track/album may be included in the selected playlist.

FIG. 4 is a more detailed block diagram of the example architecture of FIG. 1, in accordance with an example embodiment of the disclosure. Referring to FIGS. 1-4, the EU client device 106 may comprise one or more of a handset, a smartphone, a personal computer, a network server, a tablet, a laptop, and/or another handheld or portable device. The EU client device 106 may comprise, for example, a main processor 414, a system memory 412, a communication subsystem 410, a sensory subsystem 413, an input/output (I/O) subsystem 411, and a display 415, which have similar functionalities as the main processor 216, the system memory 214, the communication subsystem 212, the sensory subsystem 213, the input/output (I/O) subsystem 211, and the display 215 (in FIG. 2A), respectively.

The distributor media backend 304 may comprise suitable circuitry, logic and/or code and may be operable to provide digital media distribution/management service (e.g., an on-line digital media sale or subscription service for digital media) and/or distributor online digital media store setup/hosting/maintenance functionalities. In this regard, the distributor media backend 304 may manage/store one or more end user (EU) media profiles (e.g., the EU media profile 315).

The EU media profile 315 may store information associated with digital media items purchased/downloaded by a corresponding end user, as well as personal media preferences information 408, media playlists information 406, authentication data 402 (e.g., used to verify end user identity and allow end user to access the user's media locker 410 with digital items, in the media library 305), media queue data 404, etc.

In operation, an end user may be browsing the digital media store 306 and may click on the ADD TO LOCKER button 318e or 320e. In instances when the user clicks the button 318e or 320e and is not logged in (e.g., determination may be based on cookies on the EU client device 106) to (has access to) the EU media profile 315 (i.e., EU is not logged into any digital media service provided by the distributor 112 and associated with the EU media profile 315), a pop-up may be displayed (e.g., on display 415) and will request sign in (authentication) information from the end user 114. The entered sign in information may be checked against the authentication information 402 in the EU media profile 315.

In instances when the user clicks on the ADD TO LOCKER button 318e or 320e and the user is already logged in to the EU media profile 315, the iframe may navigate to the embed URL associated with the widget (e.g., URLs 228 or 234), which may result in a Remote Procedure Call (RPC) to the backend that contains the corresponding digital media information (e.g., the DRH media server 202 or another location storing the digital media associated with the widget). If the embed URL (e.g., 228 or 234) points to a track (or album) that still has the embeddable field set to TRUE, the unique key (pointer) to that track will be added to the currently logged in user's digital media locker 410. The buttons "ADD TO LOCKER" 318e or 320e may then change to "ADDED. LISTEN NOW". If, however, the cookie (on the client device 106) is expired and the RPC fails, the button 318e (or 320e) may change to "ERROR. Clicking on that button again may take the user to a new tab to sign in to the EU media profile 315 and attempt to receive the track 206 or album 208 again. Clicking "LISTEN NOW" may take the user to a playlist (e.g., a media playlist managed by the media playlists module 406), where that track/album now appears after the ADD TO LOCKER button 318e (or 320e) has been activated.

If the user tries to play the track 206 or album 208, the client device 106 may be pointed to (redirected) to the URL location of the track/album in the media server 202, so that the track/album may be streamed and played directly from the media server 202. In other instances, upon activating the ADD TO LOCKER button 318e (or 320e), copies of the free track 206 and album 208 may be copied into the EU media locker 410 and played/streamed directly from the media library 305.

The DRH 110 may still be able to control downloads of the DRH media (206, . . . , 207 and 208, . . . , 209) by, for example, indicating that the corresponding track/album is no longer free by changing the EMBEDDABLE: field to FALSE. Any such indication/change in the EMBEDDABLE: field may be communicated to the distributor media backend 304 so that appropriate fees may be charged to the end user 114, or the no-longer-free digital media items deleted from the user's media locker 410.

Figure 5:
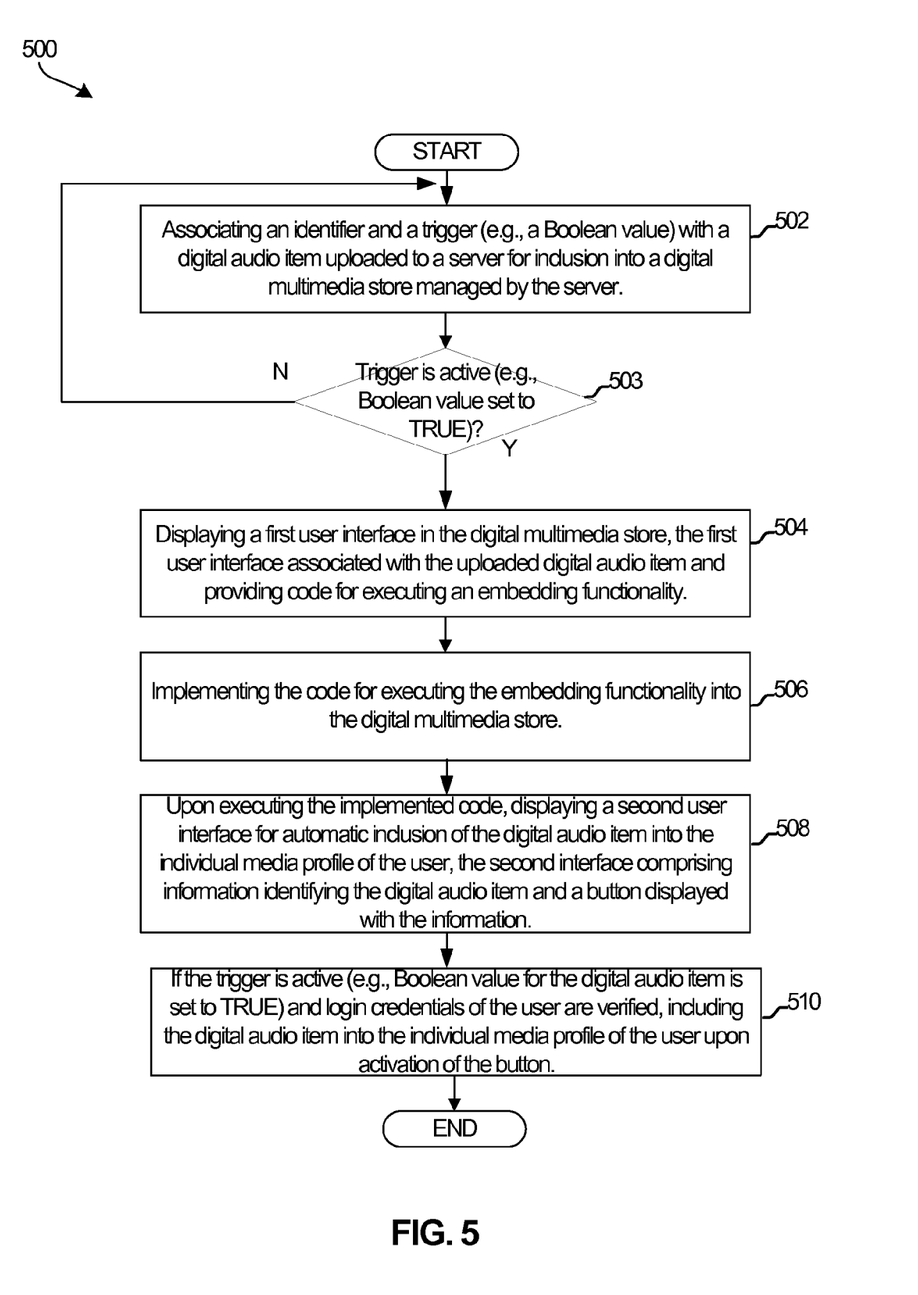
FIG. 5 is a flow chart illustrating example steps of a method for uploading content to a server, in accordance with an embodiment of the disclosure.

FIG. 5 is a flow chart illustrating example steps of a method for uploading content to a server, in accordance with an embodiment of the disclosure. Referring to FIGS. 1-5, the example method 500 may start at 502, when an identifier (e.g., 206a, 208a, 208e, . . . , 208f) and a Boolean value (e.g., 206b, 208b, 208g, . . . , 208h) may be associated with a digital media item (e.g., song 206, album 208) uploaded to a server (e.g., 202 or 305) for inclusion into a digital multimedia store (e.g., 306) managed by the server. At 503, it may be determined whether the Boolean value is set to TRUE. If it is set to TRUE, at 504, a first user interface (e.g., displaying the EMBED buttons 220, 222) may be provided in the digital multimedia store. The first user interface may be associated with the uploaded digital audio item and providing code (e.g., 226, 232, 228, 234) for executing an embedding functionality.

At 506, the code for executing the embedding functionality (e.g., 226, 232) may be implemented into the digital multimedia store (e.g., 306). At 508, upon executing the implemented code, a second user interface may be displayed (e.g., the distributor widgets 318, 320) for automatic inclusion of the digital audio item into the individual media profile of the user (e.g., media profile 315 and media locker 410). The second interface may include information identifying the digital audio item (e.g., 318a-318d, 320a-320d) and a button displayed with the information (e.g., 318e, 320e). At 510, if the Boolean value for the digital audio item is set to TRUE and login credentials of the user are verified, the digital audio item (e.g., track 206 and/or album 208) may be included into the individual media profile of the user upon activation of the button (e.g., activating the ADD TO LOCKER buttons 318e, 320e).

Even though a trigger (e.g., field 206) is disclosed as a Boolean value, other software and/or hardware implementations of a trigger may also be utilized herein to perform the functionality disclosed above as it relates to the "Embeddable:TRUE/FALSE" Boolean trigger.

Other implementations may provide a machine-readable storage device, having stored thereon, a machine code and/or a computer program having at least one code section executable by a machine and/or a computer, thereby causing the machine and/or computer to perform the steps as described herein for uploading content to a server.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method comprising:
   associating an identifier and a trigger with a digital audio item uploaded to a server by a digital rights holder of the digital audio item for inclusion into a digital multimedia store managed by the server, wherein the identifier identifies the digital audio item from a plurality of other audio items available at the digital multimedia store;
   displaying, only when the trigger is active, a first user interface of the digital multimedia store to a media distributor distinct from the digital rights holder, the first user interface associated with the digital audio item and the first user interface displaying an embedding interface with the digital audio item, wherein if the embedding interface is activated by the media distributor, a site of the media distributor is provided with a code for executing an embedding functionality that allows for automatic inclusion of the digital audio item into the site of the media distributor;
   receiving a first request to embed the digital audio item into the site of the media distributor;
   responsive to the request to embed the digital audio item into the site of the media distributor, providing, via the embedding functionality, a second user interface to the site of the media distributor;
   receiving, via the second user interface, a second request to obtain the digital audio item via the site of the media distributor; and
   including, in response to the second request, the digital media item into an individual media profile of a first user of the digital media store, the media profile managed by the server and associated with the digital multimedia store.

2. The method according to claim 1, wherein:
   the trigger comprises a Boolean value; and
   if the trigger is active, the Boolean value is set to TRUE.

3. The method according to claim 1, wherein the code for executing the embedding functionality comprises a URL record associated with a storage location hosting the uploaded digital audio item.

4. The method according to claim 1, wherein the first user interface comprises an "Embed" button displayed with the digital audio item, wherein if a user selects the "Embed" button, the user is provided with the code for executing the embedding functionality.

5. The method according to claim 4, comprising:
   implementing the code for executing the embedding functionality into the digital multimedia store.

6. The method according to claim 5, wherein upon executing the implemented code, the embedding functionality displays a second user interface for automatic inclusion of the digital audio item into the individual media profile of the first user.

7. The method according to claim 6, wherein the second interface comprises information identifying the digital audio item and a button displayed with the information.

8. The method according to claim 7, comprising:
   upon activation of the button:
      verifying the trigger is active; and
      verifying login credentials of the first user for accessing the individual media profile.

9. The method according to claim 8, comprising:
   if the trigger is active and the login credentials are verified, including the digital audio item into the individual media profile of the first user.

10. The method according to claim 9, comprising:
    including the digital audio item into one or both of a music playlist and a music queue.

11. The method of claim 1, wherein upon execution, the embedding functionality further allows for automatic inclusion of the digital audio item into a website distinct from the digital multimedia store.

12. The method of claim 1, wherein, subsequent to execution of the embedding functionality, the digital audio item is playable by a second user distinct from the first user.

13. A system comprising:
    a server comprising a memory and at least one processor, the at least one processor operable to associate an identifier and a trigger with a digital audio item uploaded to a server by a digital rights holder of the digital audio item for inclusion into a digital multimedia store managed by the server, wherein:
    the identifier identifies the digital audio item from a plurality of other audio items available at the digital multimedia store;
    said at least one processor is further operable to display, only when the trigger is active, a first user interface of the digital multimedia store to a media distributor distinct from the digital rights holder, the first user interface associated with the digital audio item and the first user interface displaying an embedding interface with the digital audio item, wherein if the embedding interface is activated by the media distributor, a site of the media distributor is provided with a code for executing an embedding functionality that allows for automatic inclusion of the digital audio item into the site of the media distributor;
    receive a first request to embed the digital audio item into the site of the media distributor;
    responsive to the request to embed the digital audio item into the site of the media distributor, provide, via the embedding functionality, a second user interface to the site of the media distributor;
    receive, via the second user interface, a second request to obtain the digital audio item via the site of the media distributor; and
    include, in response to the second request, the digital media item into an individual media profile of a first user of the digital media store, the media profile managed by the server and associated with the digital multimedia store.

14. The system according to claim 13, wherein the automatic inclusion of the digital audio item into the individual media profile takes place without payment of any fees by the first user.

15. The system according to claim 13, wherein the code for executing the embedding functionality comprises a URL record associated with a storage location hosting the uploaded digital audio item.

16. The system according to claim 13, wherein the first user interface comprises an "Embed" button displayed with the digital audio item, wherein if a user selects the "Embed" button, the user is provided with the code for executing the embedding functionality.

17. The system according to claim 16, wherein the at least one processor is operable to:
   implement the code for executing the embedding functionality into the digital multimedia store.

18. The system according to claim 17, wherein the at least one processor is operable to:
   upon executing the implemented code, displaying a second user interface for automatic inclusion of the digital audio item into the individual media profile of the user.

19. The system according to claim 18, wherein the second interface comprises information identifying the digital audio item and a button displayed with the information.

20. The system according to claim 19, wherein the at least one processor is operable to:
   upon activation of the button:
      verify the trigger is active; and
      verify login credentials of the user for accessing the individual media profile.

21. The system according to claim 20, wherein the at least one processor is operable to:
   include the digital audio item into the individual media profile of the user, if the trigger is active and the login credentials are verified.

22. The method of claim 11, wherein the website comprises a social media network, and the embedding functionality further allows for automatic inclusion of the digital media item into a profile of the first user at the social media network.

\* \* \* \* \*